United States Patent
Huseby et al.

(10) Patent No.: US 12,099,222 B2
(45) Date of Patent: Sep. 24, 2024

(54) PHOTOCHROMIC ARTICLES

(71) Applicant: 3M INNOVATIVE PROPERTIES COMPANY, St. Paul, MN (US)

(72) Inventors: Kevin T. Huseby, Oakdale, MN (US); Michael Benton Free, Stillwater, MN (US); Victor Ho, St. Paul, MN (US); Stephen A. Johnson, Woodbury, MN (US); Christopher W. A. Krohe, Minneapolis, MN (US)

(73) Assignee: 3M Innovative Properties Company, St. Paul, MN (US)

(*) Notice: Subject to any disclaimer, the term of this patent is extended or adjusted under 35 U.S.C. 154(b) by 766 days.

(21) Appl. No.: 17/260,509

(22) PCT Filed: Aug. 20, 2019

(86) PCT No.: PCT/IB2019/057008
§ 371 (c)(1),
(2) Date: Jan. 14, 2021

(87) PCT Pub. No.: WO2020/039347
PCT Pub. Date: Feb. 27, 2020

(65) Prior Publication Data
US 2021/0302633 A1 Sep. 30, 2021

Related U.S. Application Data

(60) Provisional application No. 62/721,956, filed on Aug. 23, 2018.

(51) Int. Cl.
*G02B 5/23* (2006.01)
*C08J 5/18* (2006.01)
*C09K 9/02* (2006.01)
*G02C 7/10* (2006.01)

(52) U.S. Cl.
CPC .............. *G02B 5/23* (2013.01); *C08J 5/18* (2013.01); *C09K 9/02* (2013.01); *G02C 7/102* (2013.01); *C08J 2367/02* (2013.01)

(58) Field of Classification Search
CPC ........... G02B 5/23; C08J 5/18; C08J 2367/02; C09K 9/02; G02C 7/102
USPC .................................. 359/241, 243
See application file for complete search history.

(56) References Cited

U.S. PATENT DOCUMENTS

| | | |
|---|---|---|
| 5,882,774 A | 3/1999 | Jonza |
| 6,040,053 A | 3/2000 | Scholz |
| 7,884,992 B1 * | 2/2011 | Wang .............. G02B 5/23 359/241 |
| 8,345,342 B2 | 1/2013 | Rossini |
| 8,986,812 B2 | 3/2015 | Hunt |
| 9,034,457 B2 | 5/2015 | Su |
| 2008/0187749 A1 | 8/2008 | Cael |
| 2009/0004478 A1 | 1/2009 | Baetzold |
| 2012/0218512 A1 | 8/2012 | Archambeau |
| 2013/0242368 A1 | 9/2013 | Ofir |
| 2016/0054491 A1 | 2/2016 | Berge |
| 2016/0170107 A1 | 6/2016 | Ryu |
| 2017/0067150 A1 | 3/2017 | David |

FOREIGN PATENT DOCUMENTS

| | | |
|---|---|---|
| JP | 10039134 | 2/1998 |
| JP | 20053265 | * 11/2005 |
| JP | 2005326503 | 11/2005 |
| WO | WO 2007-091082 | 8/2007 |
| WO | WO 2015-148619 | 10/2015 |

OTHER PUBLICATIONS

Cohen and Gutoff, Modern Coating and Drying Technology, VCH Publishers, New York, NY, 1992, ISBN 3-527-28246-7, 7 pages.
Gutoff and Cohen, Coating and Drying Defects: Troubleshooting Operating Problems, Wiley Interscience, New York, NY, 16 pages.
Greiner, "Polyamide Resins (Nonnylon Types)", CEH Marketing Research Report, Chemical Economics Handbook—SRI Consulting, Aug. 2009, 57 pages.
Reversacol™ Photochromic Dyes, Vivimed, 12 pages.
International Search Report for PCT International Application No. PCT/IB2019/057008, mailed on Dec. 6, 2019, 4 pages.

* cited by examiner

*Primary Examiner* — William Cho
(74) *Attorney, Agent, or Firm* — Philip P. Soo

(57) ABSTRACT

Photochromic article having first and second opposed major surfaces comprising a first, transparent layer having first and second opposed major surfaces, the first layer comprising thermoplastic, a second, transparent layer having first and second opposed major surfaces, the second layer comprising photochromic dye and amorphous copolyester, wherein the first major surface of the second layer is adjacent to the second major surface of the first layer, and a third layer having first and second opposed major surfaces, wherein the first major surface of the third layer is adjacent to the second major surface of the second layer. Embodiments of photochromic article described herein are useful, for example in eyewear, window films, security films, decorative films, electronic devices (i.e., having a display with a photochromic article).

16 Claims, No Drawings

PHOTOCHROMIC ARTICLES

CROSS REFERENCE TO RELATED APPLICATIONS

This application is a national stage filing under 35 U.S.C. § 371 of PCT/IB2019/057008, filed Aug. 20, 2019, which claims the benefit of Provisional Application No. 62/721,956, filed Aug. 23, 2018, the disclosures of which are incorporated by reference their entirety herein.

BACKGROUND

Photochromism is a phenomenon in which a compound, upon exposure to light containing ultraviolet rays, changes color, and, upon removal from light irradiation, returns to its original color. The color changes that occur in photochromic compounds are generally reversible. Photochromic dyes can be utilized, for example, in lenses and eyeglasses in order to protect the eyes from the harmful effects of the sun's ultraviolet radiation.

Photochromic dyes reversibly alter their color upon exposure to ultraviolet (UV) sources. These dyes respond to ultra-violet (UV) irradiation (e.g., the UV component of sunlight) by changing in color. When the UV stimulus is removed, the dye returns to a partially or completely colorless state. Photochromic dyes are typically not reactive in the crystalline state and need to be dissolved or dispersed in a polymer or solvent to function.

Photochromic coatings and material layers are often applied to optical elements (e.g., lenses, sunglasses, and windows) for controlling the characteristics of light passing through these optical elements. A significant drawback of photochromic materials available today is their transition time and transition half time. Transition half time is expressed as the time in seconds required for the optical element to return to an optical density of one half the equilibrium value.

Current transition times typically range from 10-15 minutes. A need exists for a process which can make a photochromic article which can activate or darken rapidly to avoid impaired vision.

SUMMARY

In one aspect, the present disclosure describes a photochromic article having first and second opposed major surfaces comprising:
  a first, transparent layer having first and second opposed major surfaces, the first layer comprising thermoplastic;
  a second, transparent layer having first and second opposed major surfaces, the second layer comprising photochromic dye and amorphous copolyester, wherein the first major surface of the second layer is adjacent to (in some embodiments, in direct contact with) the second major surface of the first layer; and
  a third layer having first and second opposed major surfaces, wherein the first major surface of the third layer is adjacent to (in some embodiments, in direct contact with) the second major surface of the second layer.

Embodiments of photochromic article described herein are useful, for example in eyewear, window films, security films, decorative films, electronic devices (i.e., having a display with a photochromic article). Embodiments of photochromic article described herein have been observed to exhibit photochromic transition times less than 10 (in some embodiments, less than 5, 4, or even less than 3) seconds. Further, for example, photochromic article described herein upon exposure to UV sources have been observed to darken up to levels allowing less than 25% visible light transmission. Such darkening and activation occurs has been observed at relatively rapid rates (e.g., typically deactivates in less than 20 seconds).

DETAILED DESCRIPTION

Photochromic article described herein can be made using techniques known in the art for making polymeric films, including coextrusion of polymeric materials, together with the disclosure herein.

Exemplary thermoplastics include at least one of polyethylene terephthalate (PET), polyethylene naphthalate (PEN), or a copolymer thereof (i.e., at least one of a copolymer of PET and PEN, a copolymer of PET and another polymer, or a copolymer of PEN and another polymer). In some embodiments, the thermoplastic comprises at least one of a polycarbonate, a poly(methyl methacrylate), a polystyrene, cyclic olefin polymer (COP), a cyclic olefin co-polymers (COC), or a poly(butylene terephthalate).

In some embodiments, the thermoplastic is present in the first layer in an amount of at least 25 (in some embodiments, at least 30, 40, 50, 60, 70, 80, 90, 95, or even, 100: in some embodiments, in a range from 25 to 100, 50 to 100, 60 to 100, 70 to 100, 80 to 100, or even 90 to 100) percent, based on the total weight of the first layer.

In some embodiments, the first layer has an average thickness of at least 5 (in some embodiments, at least 10, 25, 50, 100, 500, 1000, 1500, 2000, or even at least 2500; in some embodiments, in a range from 5 to 2500, 5 to 1000, 10 to 1000, 5 to 500, 10 to 500, 10 to 100, 10 to 50, or even 20 to 40) micrometers.

In some embodiments, the first layer further comprises at least one of a pigment or dye that absorbs at least one wavelength in a range from 280 nm to 2000 nm (in some embodiments, in the ultraviolet (UV) range (i.e., 280 nm to less than 400 nm): visible range (i.e., 400 nm to less than 700 nm), or infrared range (i.e., 700 nm to 2000 nm); in some embodiments, 280 nm to less than 700 nm or 400 nm to 2000 nm). Exemplary pigments include carbon black, tungsten blue oxide, UV absorbers (available, for example, under the trade designation "TINUVIN 1577" from BASF, Ludwigshafen, Germany), and titanium dioxide. Exemplary dyes include dichroic dyes.

Exemplary photochromic dyes in the second layer include at least one of a spiroxazine or a naphthopyran.

Exemplary amorphous copolyesters in the second layer include at least one of polyethylene terephthalate (glycol modified), polyethylene terephthalate/sebacate, or polyethylene terephthalate/adipate.

In some embodiments, the photochromic dye is present in the second layer in an amount of at least 0.01 (in some embodiments, in an amount of at least 0.02, 0.03, 0.04, 0.05, 0.1, 0.15, 0.20, 0.25, 0.5, 0.75, 1, 2, 3, 4, 5, 6, 7, 8, 9, or even 10; in some embodiments, in a range from 0.01 to 10, 0.05 to 5, 0.05 to 2, 0.1 to 5, 0.1 to 2, or even 0.5 to 2) percent and amorphous copolyester in an amount up to 99.99 (in some embodiments, up to 99.98, 99.97, 99.96, 99.95, 99.9, 99.85, 99.8, 99.75, 99.5, 99.25, 99, 98, 97, 96, 95, 94, 93, 92, 91, even up to 90: in some embodiments, in a range from 99.99 to 90, 99.95 to 95, 99.95 to 98, 99.9 to 95, 99.9 to 98, or even 99.5 to 98) percent, based on the total weight of the second layer.

In some embodiments, the second layer further comprises a plasticizer. Exemplary plasticizers include at least one of dioctyl sebacate or triethlene glycol diacetate. In some embodiments, the second layer comprises at least 2 (in some embodiments, at least 3, 4, 5, 10, or even at least 15: in some embodiments, in a range from 2 to 15, 2 to 10, or even 2 to 5) percent by weight, based on the total weight of the second layer.

In some embodiments, the second layer has an average thickness of at least 5 (in some embodiments, at least 10, 25, 50, 100, 150, or even 200: in some embodiments, in a range from 5 to 200, 5 to 150, 5 to 100, 5 to 75, 5 to 50, or even 5 to 25) micrometers.

In some embodiments, the copolyester in the second layer has a glass transition temperature, $T_g$, not greater than 90° C. (in some embodiments, not greater than 80° C., 70° C., 60° C., 50° C., 40° C., 35° C., 20° C., or even not greater than 0° C.: in some embodiments, in a range from −25° C. to −45° C.). $T_g$ was measured by conventional Differential Scanning calorimetry (DSC) using a modulated DSC (available, for example, under the trade designation "Q200" from TA Instruments, Wood Dale., IL). Conditions of measurement: scan from 30° C. to 300° C. at 20° C./min. Reported $T_g$ is the midpoint $T_g$ (C).

In some embodiments, the copolyester in the second layer can have a Tensile Modulus at 25° C., as determined by ASTM D638 (2008), the disclosure of which is incorporated herein by reference not greater than 3000 (in some embodiments, not greater than 2900, 2800, 2700, 2600, 2500, 2400, 2300, 2200, or even not greater than 2100) MPa.

In some embodiments, the second layer has fade speed of up to 5 (in some embodiments, up to 10, 15, 20, 25, 30, 45, or even up to 60) seconds. Fade speed is defined as the time required to reach half its initial activated color strength. In some embodiments, the second layer has an activation speed of up to 5 (in some embodiments, up to 10, 15, or even up to 20) seconds. Activation speed is time to reach 90% changed. In some embodiments, photochromic articles described herein have in an unactuated state at 610 nanometers a first visible light transmission and in an actuated state at 610 nanometers a second visible light transmission, wherein the difference between the second visible light transmission and the first visible transmission is at least 80 (in some embodiments, at least 70, 60, 50, 40, 20, or even at least 10) percent. Fade and activation speeds are determined as described in "Photochromic Transition Testing" in the Examples.

In some embodiments, the semi-crystalline polyester of the third layer comprises at least one of polyethylene terephthalate (PET) or polyethylene naphthalate (PEN), or a copolymer thereof (i.e., at least one of a copolymer of PET and PEN, a copolymer of PET and another polymer, or a copolymer of PEN and another polymer). In some embodiments, the third layer comprises polypropylene.

In some embodiments, the third layer is a multi-layer optical film. Multi-layer films are known in the art (see e.g., U.S. Pat. No. 5,882,774 (Jonza, et al.), the disclosure of which is incorporated herein by reference). Multilayer optical films are useful, for example, as highly efficient mirrors and/or polarizers. Exemplary multilayer optical films include a multilayer stack having alternating layers of at least two materials. At least one of the materials may have the property of stress-induced birefringence, such that the index of refraction (n) of the material is affected by a stretching process. By stretching the multilayer stack over a range of uniaxial to biaxial orientation, a film may be created with a range of reflectivities for differently oriented plane-polarized incident light.

In some embodiments, the third layer further comprises at least one of a pigment or dye that absorbs at least one wavelength in a range from 280 nm to 2000 nm (in some embodiments, in the ultra violet (UV) range (i.e., 280 nm to less than 400 nm): visible range (i.e., 400 nm to less than 700 nm), or infrared range (i.e., 700 nm to 2000 nm): in some embodiments, 280 nm to less than 700 nm or 400 nm to 2000 nm).

In some embodiments, the first surface of the article has a surface roughness at least 20 (in some embodiments, at least 30, 40, 50, 75, 100, 150, or even at least 200; in some embodiments, in a range from 20 to 200 nm, 20 to 150, 20 to 100, or even 20 to 50) RMS (root mean square). Surface roughness can provide an article with an anti gloss (AG) surface. The surface can be achieved with various methods, such as by applying an AG coating or a by chemically etching the surface. For an AG coating, the surface can be coated with organic or non-organic droplets or particles. Such coatings can provide desired scattering properties, but normally are not very resistant to scratches. Also, such a coating may produce high sparkle, which is an undesirable optical artifact for high resolution (small pixels) display devices. Reduction in the specular reflection (a significant factor in glare) from film surfaces is often desired, especially by manufacturers whose products are designed for outdoor use where glare can be exacerbated by sunlight. One way to reduce the intensity of the specular reflection, quantified as gloss, is to roughen a film surface. The dimensions of the roughness or texture should be large enough to scatter visible light, producing a slightly hazy or matte surface, but not so large as to significantly affect the transparency of the film.

In some embodiments, the third layer has an average thickness of at least 5 (in some embodiments, at least 10, 25, 50, 100, 500, 1000, 1500, 2000, or even at least 2500; in some embodiments, in a range from 5 to 2500, 5 to 1000, 10 to 1000, 5 to 500, 10 to 500, 10 to 100, 10 to 50, or even 20 to 40) micrometers.

In some embodiments, the article has a shrinkage at 150° C. of less than 1.5 (in some embodiments, less than 1.4, 1.3, 1.23, 1.1, 1, 0.9, 0.8, 0.9, 0.8, 0.0.7 or even less than 0.6; in some embodiments, in a range from less than 1.5 to 0.6) percent.

In some embodiments, at least one of the first, second, or third layers further comprise at least two sublayers. That is, each of the layers described herein may itself be layered. For example, the first layer may comprise a sub-layer of a thermoplastic consisting of polyethylene terephthalate (PET) and another sublayer of polyethylene naphthalate (PEN).

In some embodiments, photochromic articles described herein further comprises a first adhesive (in some embodiments, a pressure sensitive adhesive (PSA)) layer disposed between the second major surface of the second layer and the first major surface of the third layer.

In some embodiments, the third layer is separable from the second layer, for example, via use of a pressure sensitive adhesive, wherein the materials of the second and third layers are selected to provide limited adhesion strength therebetween.

In some embodiments, the first adhesive layer has a higher adhesive affinity to the second major surface of the second layer than to the first major surface of the third layer, wherein the adhesion between adjacent layers is weak enough to permit a layer to be delaminated from a remainder of the film stack, and the stack is configured to promote such delamination between the second major surface of the adhesive and the first major surface of the third layer, thus tuning the third layer into what is sometimes referred to as a release layer or carrier layer.

In some embodiments, photochromic articles described herein have an average thickness of at least 15 (in some embodiments, at least 20, 25, 30, 35, 40, 45, 50, 75, or even at least 100) micrometers.

In some embodiments, photochromic articles described herein have an optical haze up to 3 (in some embodiments, up to 2.5, 2, 1.5, 1, or even up to 0.5) percent, as determined by the "Haze Test" described in the Examples.

In some embodiments, photochromic articles described herein further comprises a tie layer between at least one of the first and second layers or second and third layers. Exemplary tie layer materials include modified ethylene acrylate resins, ethylene methyl acrylate copolymers, styrene and ethylene/butylene copolymers.

In some embodiments, photochromic articles described herein have a hard coat on at least one of the first or second major surfaces thereof. Exemplary hardcoats are known in the art and include ultraviolet (UV) cured acrylate polymers with or without nanosilica, and urethane acrylates. Method for providing a hardcoat are known in the art, and includes methods using dip coating, forward and reverse roll coating, wire wound rod coating, and die coating (e.g., using die coaters such as knife coaters, slot coaters, slide coaters, fluid bearing coaters, slide curtain coaters, drop die curtain coaters, and extrusion coaters) (see, e.g., Edward Cohen and Edgar Gutoff, *Modern Coating and Drying Technology*, VCH Publishers, New York, NY, 1992, ISBN 3-527-28246-7 and Gutoff and Cohen, *Coating and Drying Defects: Troubleshooting Operating Problems*, Wiley Interscience, New York, NY: see also art (see, e.g., U.S. Pat. Pub. No. 20090004478A1 (Bactzold et al.)).

In some embodiments, photochromic articles described herein exhibit nanostructured features on at least one of the first or second major surfaces thereof. Nanostructured features and methods of providing nanostructured features are known in the art and include depositing a layer upon a major surface of a substrate (e.g., a photochromic article) by, for example, plasma chemical vapor deposition from a gaseous mixture while substantially simultaneously etching the surface with a reactive species (see e.g., U.S. Pat. Pub. No. 20170067150 A1 (David et al.)).

In some embodiments, photochromic articles described herein exhibit microstructured features on at least one of the first or second major surfaces thereof. Microstructured features and methods of providing microstructured features are known in the art, and may include the steps of (a) preparing a polymerizable composition: (b) depositing the polymerizable composition onto a master negative microstructured molding surface in an amount barely sufficient to fill the cavities of the master: (c) filling the cavities by moving a bead of the polymerizable composition between a performed base (e.g., in the instant disclosure a photochromic article) and the master, at least one of which is flexible; and (d) curing the composition (see generally, for example, U.S. Pat. No. 8,986,812 (Hunt et al.)).

In some embodiments, photochromic articles described herein have at least one of an antireflective or anti-fogging coating on at least one of the first or second major surfaces thereof. Antireflective and anti-fogging coatings and methods of providing antireflective and anti-fogging coatings are known in the art, and may include using conventional techniques, such as bar, roll, curtain, rotogravure, spray, or dip coating techniques, or air knife coating to adjust the coating thickness. To enhance the coating uniformity coating and wetting, it may be desirable to oxidize the substrate surface using corona discharge or flame treatment method (see, e.g., U.S. Pat. No. 6,040,053 (Scholz et al.)).

Optionally, photochromic articles described herein are stretched. In some embodiments, photochromic articles described herein may be uniaxially or biaxially stretched polymeric films. Stretching may be done by any of a variety of methods known in the art, including o length orienting, tentering, simultaneous biaxially tentering, film blowing, and tubular film processes.

Optionally, photochromic articles described herein are annealed. Annealing, sometimes also referred to as heat-setting, is known in the art (see, e.g., PCT Pub. No. WO2007091082 A1 (Eveson et al.)), and refers to the step of heating the film at elevated temperatures above its $T_g$, optionally while under restraint, and can affect the behavior of the film in subsequent post-processing or fabrication, for instance in the manufacture of the photochromic article. Annealing can prevent or minimize the formation of haze in a biaxially oriented polymer film, as well as provide dimensional stabilization in a polymer film.

Embodiments of photochromic article described herein are useful, for example in eyewear, window films, security films, decorative films, electronic devices (i.e., having a display with a photochromic article).

EXEMPLARY EMBODIMENTS

1A. A photochromic article having first and second opposed major surfaces comprising:
  a first, transparent layer having first and second opposed major surfaces, the first layer comprising thermoplastic;
  a second, transparent layer having first and second opposed major surfaces, the second layer comprising photochromic dye and amorphous copolyester, wherein the first major surface of the second layer is adjacent to the second major surface of the first layer; and
  a third layer having first and second opposed major surfaces, wherein the first major surface of the third layer is adjacent to with the second major surface of the second layer.

2A. The photochromic article of Exemplary Embodiment IA, wherein the first major surface of the second layer is in direct contact with the second major surface of the first layer; and wherein the first major surface of the third layer is in direct contact with the second major surface of the second layer.

3A. The photochromic article of any preceding A Exemplary Embodiment, wherein the thermoplastic is present in the first layer in an amount of at least 25 (in some embodiments, at least 30, 40, 50, 60, 70, 80, 90, 95, or even, 100: in some embodiments, in a range from 25 to 100, 50 to 100, 60 to 100, 70 to 100, 80 to 100, or even 90 to 100) percent, based on the total weight of the first layer.

4A. The photochromic article of any preceding A Exemplary Embodiment, wherein the thermoplastic comprises at least one of polyethylene terephthalate (PET), polyethylene naphthalate (PEN), or a copolymer thereof (i.e., at least one of a copolymer of PET and PEN, a copolymer of PET and another polymer, or a copolymer of PEN and another polymer).

5A. The photochromic article of any of Exemplary Embodiments 1A to 3A, wherein the thermoplastic comprises at least one of a polycarbonate, a poly (methyl methacrylate), a polystyrene, a cyclic olefin polymer (COP), a cyclic olefin co-polymer (COC) or a poly(butylene terephthalate).

6A. The photochromic article of any preceding A Exemplary Embodiment, wherein the first layer further comprises at least one of a pigment or dye that absorbs at least one wavelength in a range from 280 nm to 2000 nm (in some embodiments, in the ultra violet (UV) range (i.e., 280 nm to less than 400 nm); visible range (i.e., 400 nm to less than 700 nm), or infrared range (i.e., 700 nm to 2000 nm); in some embodiments, 280 nm to less than 700 nm or 400 nm to 2000 nm).

7A. The photochromic article of any preceding A Exemplary Embodiment, wherein the photochromic dye is present in the second layer in an amount of at least 0.01 (in some embodiments, in an amount of at least 0.02, 0.03, 0.04, 0.05, 0.1, 0.15, 0.20, 0.25, 0.5, 0.75, 1, 2, 3, 4, 5, 6, 7, 8, 9, or even 10; in some embodiments, in a range from 0.01 to 10, 0.05 to 5, 0.05 to 2, 0.1 to 5, 0.1 to 2, or even 0.5 to 2) percent and amorphous copolyester is present in an amount up to 99.99 (in some embodiments, up to 99.98, 99.97, 99.96, 99.95, 99.9, 99.85, 99.8, 99.75, 99.5, 99.25, 99, 98, 97, 96, 95, 94, 93, 92, 91, even up to 90: in some embodiments, in a range from 99.99 to 90, 99.95 to 95, 99.95 to 98, 99.9 to 95, 99.9 to 98, or even 99.5 to 98) percent, based on the total weight of the second layer.

8A. The photochromic article of any of preceding A Exemplary Embodiment, wherein the first layer has an average thickness of at least 5 (in some embodiments, at least 10, 25, 50, 100, 500, 1000, 1500, 2000, or even at least 2500: in some embodiments, in a range from 5 to 2500, 5 to 1000, 10 to 1000, 5 to 500, 10 to 500, 10 to 100, 10 to 50, or even 20 to 40) micrometers.

9A. The photochromic article of any of preceding A Exemplary Embodiment, wherein the article has a shrinkage at 150° C. of less than 1.5 (in some embodiments, less than 1.4, 1.3, 1.23, 1.1, 1, 0.9, 0.8, 9.7 or even less than 0.6; in some embodiments, in a range from less than 1.5 to 0.6) percent.

10A. The photochromic article of any preceding A Exemplary Embodiment, wherein the first layer further comprises at least two sublayers.

11A. The photochromic article of any preceding A Exemplary Embodiment, wherein the first surface of the article has a surface roughness in a range from 20 to 200 nm (in some embodiments at least 20, 30, 40, 50, 75, 100, 150, or even at least 200; in some embodiments, in a range from 20 to 150, 20 to 100, or even 20 to 50) RMS (root mean square).

12A. The photochromic article of any of preceding A Exemplary Embodiment, wherein the second layer has an average thickness of at least 5 (in some embodiments, at least 10, 25, 50, 100, 150, or even 200; in some embodiments, in a range from 5 to 200, 5 to 150, 5 to 100, 5 to 75, 5 to 50, or even 5 to 25) micrometers.

13A. The photochromic article of any preceding A Exemplary Embodiment, wherein the photochromic dye is at least one of a spiroxazine or a naphthopyran.

14A. The photochromic article of any preceding A Exemplary Embodiment, wherein the copolyester in the second layer has a glass transition temperature, $T_g$, not greater than 90° C. (in some embodiments, not greater than 80° C., 70° C., 60° C., 50° C., 40° C., 35° C., 20° C., or even not greater than 0° C.: in some embodiments, in a range from −25° C. to −45° C.).

15A. The photochromic article of any preceding A Exemplary Embodiment, wherein the copolyester in the second layer has a Tensile Modulus at 25° C. not greater than 3000 (in some embodiments, not greater than 2900, 2800, 2700, 2600, 2500, 2400, 2300, 2200, or even not greater than 2100) MPa.

16A. The photochromic article of any preceding A Exemplary Embodiment, wherein the second layer further comprises a plasticizer.

17A. The photochromic article of any preceding A Exemplary Embodiment having in an unactuated state at 610 nanometers and a first visible light transmission and in an actuated state at 610 nanometers a second visible light transmission, when the difference between the second visible light transmission and the first transmission is at least 80 (in some embodiments, at least 70, 60, 50, 40, 20, or even at least 20) percent.

18A. The photochromic article of any preceding A Exemplary Embodiment, wherein the second layer has fade speed of up to 5 (in some embodiments, up to 10, 15, 20, 25, 30, 45, or even up to 60) seconds.

19A. The photochromic article of any preceding A Exemplary Embodiment, wherein the second layer has an activation speed of up to 5 (in some embodiments, up to 10, 15, or even up to 20) seconds.

20A. The photochromic article of any preceding A Exemplary Embodiment, wherein the second layer further comprises at least two sublayers.

21A. The photochromic article of any preceding A Exemplary Embodiment, wherein the semi-crystalline polyester of the third layer comprises at least one of polyethylene terephthalate (PET) or polyethylene naphthalate (PEN), or copolymers thereof (i.e., at least one of a copolymer of PET and PEN, a copolymer of PET and another polymer, or a copolymer of PEN and another polymer).

22A. The photochromic article of any preceding A Exemplary Embodiment, wherein the third layer comprises polypropylene.

23A. The photochromic article of any preceding A Exemplary Embodiment, wherein the third layer further comprises at least one of a pigment or dye that absorbs at least one wavelength in a range from 280 nm to 2000 nm (in some embodiments, in the ultra violet (UV) range (i.e., 280 nm to less than 400 nm); visible range (i.e., 400 nm to less than 700 nm), or infrared range (i.e., 700 nm to 2000 nm); in some embodiments, 280 nm to less than 700 nm or 400 nm to 2000 nm).

24A. The photochromic article of any of preceding A Exemplary Embodiment, wherein the third layer has an average thickness of at least 5 (in some embodiments, at least 10, 25, 50, 100, 500, 1000, 1500, 2000, or even at least 2500; in some embodiments, in a range from 5 to 2500, 5 to 1000, 10 to 1000, 5 to 500, 10 to 500, 10 to 100, 10 to 50, or even 20 to 40) micrometers.

25A. The photochromic article of any preceding A Exemplary Embodiment, wherein the third layer further comprises at least two sublayers.

26A. The photochromic article of any preceding A Exemplary Embodiment, wherein the third layer is a multilayer optical film.

27A. The photochromic article of any preceding A Exemplary Embodiment further comprising a first adhesive (in some embodiments, a pressure sensitive adhesive (PSA)) layer disposed between the second major surface of the second layer and the first major surface of the third layer.

28A. The photochromic article of Exemplary Embodiment 27A, wherein the first adhesive layer has a higher adhesive affinity to the second major surface of the second layer than to the first major surface of the third layer.

29A. The photochromic article of any preceding A Exemplary Embodiment comprises an adhesive.

30A. The photochromic article of any preceding A Exemplary Embodiment, wherein the third layer is separable from the second layer.

31A. The photochromic article of any preceding A Exemplary Embodiment having an average thickness of at least 15 (in some embodiments, at least 20, 25, 30, 35, 40, 45, 50, 75, or even at least 100) micrometers.

32A. The photochromic article of any preceding A Exemplary Embodiment having an optical haze up to 3 (in some embodiments, up to 2.5, 2, 1.5, 1, or even up to 0.5) percent.

33A. The photochromic article of any preceding A Exemplary Embodiment that is a coextruded article.

34A. The photochromic article of any preceding A Exemplary Embodiment that is a uniaxially or biaxially stretched polymeric film.

35A. The photochromic article of any preceding A Exemplary Embodiment, further comprising a tie layer between at least one of the first and second layers or second and third layers.

36A. The photochromic article of any preceding A Exemplary Embodiment, wherein at least one of the first or second major surfaces of the photochromic article has a hard coat thereon.

37A. The photochromic article of any preceding A Exemplary Embodiment, wherein at least one of the first or second major surfaces of the photochromic article exhibits nanostructured features.

38A. The photochromic article of any preceding A Exemplary Embodiment, wherein at least one of the first or second major surfaces of the photochromic article exhibits microstructured features.

39A. The photochromic article of any preceding A Exemplary Embodiment, wherein at least one of the first or second major surfaces has an antireflective coating thereon.

1B. Eyewear comprising the photochromic article of any preceding A Exemplary Embodiment.

1C. A window film comprising the photochromic article of any preceding A Exemplary Embodiment.

1D. A security film comprising the photochromic article of any preceding A Exemplary Embodiment.

1E. An electronic device having a display with a photochromic article of any preceding A Exemplary Embodiment.

1F. A decorative film comprising the photochromic article of any preceding A Exemplary Embodiment.

1G. A method comprising stretching a photochromic article of any preceding A Exemplary Embodiment.

1H. A method comprising annealing a photochromic article of any preceding A Exemplary Embodiment.

1I. A method comprising stretching and annealing a photochromic article of any preceding A Exemplary Embodiment.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Examples 1-5

A film cast web was prepared as follows. A 3-layer film was co-extruded. The extruders for the first and third layers were 18 mm twin screw extruders (TSEs). The extruder for the second layer was a 27 mm TSE. The first and third extruders were fed a polyethylene terephthalate (PET) of 0.62 inherent viscosity (IV) (obtained under the trade designation "TAIRILIN IN404" from Nan Ya Plastics Corporation, Lake City, SC), each at 4.5 kg/hr. The second extruder was fed a copolyester resin made from 100 mol % ethylene glycol as the diol component and having 60 mol % terephthalic and 40% sebacic moieties from the diacid/diester monomer components, coPET60 (obtained under the trade designation "MOR-ESTER AF-428 P" from Dow Chemical Co., Midland, MI) with from 0 to 1 wt. % (depending on the Example—see amount for each Example in Table 1, below) of a photochromic (purple) dye (obtained under the trade designation "REVERSACOL PALATINATE PURPLE" from Vivimed Labs Europe Ltd., Huddersfield West, Yorkshire, England), at 4.5 kg/hr.

TABLE 1

| Example | First Layer | Second Layer | Third Layer |
|---|---|---|---|
| 1 | PET | CoPET60 | PET |
| 2 | PET | CoPET60 + 1.00 wt. % Purple | PET |
| 3 | PET | CoPET60 + 0.50 wt. % Purple | PET |
| 4 | PET | CoPET60 + 0.25 wt. % Purple | PET |
| 5 | PET | CoPET60 + 0.25 wt. % Purple | PET |
| 6 | PET + 1 wt. % UVA | CoPET60 + 0.25 wt. % Purple | PET + 1 wt. % UVA |
| 7 | PET + 2 wt. % IR Absorber | CoPET60 + 0.25 wt. % Purple | PET + 2 wt. % IR Absorber |
| 8 | PET + 2 wt. % IR Absorber + 1 wt. % UVA | CoPET60 + 0.25 wt. % Purple | PET + 2 wt. % IR Absorber + 1 wt. % UVA |
| 9 | PET | CoPET60:PET (50:50) + 0.25 wt. % Purple | PET |
| 10 | PET + 0.25 wt. % Purple | CoPET60 | PET + 0.25 wt. % Purple |
| 11 | PET | PETG | PET |
| 12 | PET | PETG + 0.09 wt. % Gray | PET |
| 13 | PET | PENg30 + 0.09 wt. % Gray | PET |
| 14 | PET | PES:PESg (50:50) + 0.09 wt. % Gray | PET |
| 15 | PET | CoPET60 + 0.09 wt. % Gray | PET |
| 16 | PET | CoPET60 + 0.09 wt. % Gray | PET + 3 wt. % UVA |
| 17 | PET | CoPET60 + 0.22 wt. % Purple | PET + 5 wt. % Carbon Black + 3 wt. % UVA |
| 18 | PET | CoPET60 + 0.22 wt. % Purple | PET + 5 wt. % Carbon Black |
| 19 | PET | CoPET60 + 0.22 wt. % Purple | PET + 10 wt. % Carbon Black |
| 20 | PET | CoPET60 + 0.22 wt. % Purple | PET + 20 wt. % Carbon Black |

The first and third extruders fed neck tubes, and gear pumps were employed to feed the extrudates into the first and third layers of a 3-layer feed block. This melt train used a progressive temperature extrusion profile, with peak temperatures of 275° C. The second extruder fed a neck tube, and a gear pump was employed to feed the extrudate into the second layer of the 3-layer feed block. This melt train used a progressive temperature extrusion profile, with peak temperatures of about 240° C. From the feed block, the three-layer extrudate was fed to a film die. The feed block and die were maintained at a target temperature of 275° C. Film from the die was cast on a casting wheel which was maintained at run at 15° C.

For these and all subsequent Examples, the casting wheel was run at two speeds so as to make cast webs of each Example at two thicknesses. The two cast web thicknesses were chosen so that, after biaxial stretching at stretch ratios of 3.5×3.5, the final stretched films would be of approximate thicknesses 1 mil (25.4 micrometers) and 2 mils (50.8 micrometers). In Table 3, data are given for each of the two thicknesses of the Exemplary films, and the thicker, 2 mils (50.8 micrometers) film is designated with the suffix "A" (e.g., as "Example 1A").

Examples 6-8

A film cast web was prepared as in Examples 1-5, except that an ultra violet absorber (UVA) (obtained under the trade designation "TINUVIN 1577" from BASF USA, Charlotte, NC) was added at 1 wt. %, and well dispersed in the polyester matrix, to the first and third layers for Example 6, or an infrared (IR) pigment (IR absorber) (obtained under the trade designation "TUNGSTEN BLUE OXIDE" from Global Tungsten & Powders Corporation, Towanda, PA) was added at 2 wt. %, and well dispersed in the polyester matrix, to the first and third layers for Example 7, or both the UVA and the IR pigment were added, well dispersed in the polyester matrix, to the first and third layers for Example 8.

Example 9

A film cast web was prepared as in Examples 1-5, except that the second extruder was fed a 50:50 by weight ratio of a polyester resin (coPET60 ("MOR-ESTER AF-428 P")) and a polyethylene terephthalate (PET) of 0.62 inherent viscosity (IV) ("TAIRILIN IN404").

Example 10

A film cast web was prepared as in Examples 1-5, except that the photochromic (purple) dye ("REVERSACOL PALATINATE PURPLE") was fed to the first and third extruders and not to the second extruder.

Example 11

A film cast web was prepared as follows. A 3-layer film was co-extruded. The extruders for the first and third layers were 18 mm twin screw extruders (TSEs). The extruder for the second layer was a 27 mm TSE. The first and third extruders were fed a polyethylene terephthalate (PET) of 0.62 inherent viscosity (IV) ("TAIRILIN IN404"), each at 4.5 kg/hr. The second extruder was fed a glycol-modified polyester resin (PETG) (obtained under the trade designation "EASTAR COPOLYESTER GN071" from Eastman Chemical Company, Kingsport TN), at 2.25 kg/hr. The first and third extruders fed neck tubes, and gear pumps were employed to feed the extrudates into the first and third layers of a 3-layer feed block. This melt train used a progressive temperature extrusion profile, with peak temperatures of 275° C. The second extruder fed a neck tube, and a gear pump was employed to feed the extrudate into the second layer of the 3-layer feed block. This melt train used a progressive temperature extrusion profile, with peak temperatures of about 240° C. From the feed block, the three-layer extrudate was fed to a film die. The feed block and die were maintained at a target temperature of 275° C. Film from the die was cast on a casting wheel which was maintained at run at 15° C.

Examples 12-15

A film cast web was prepared as follows. A 3-layer film was co-extruded. The extruders for the first and third layers were 18 mm twin screw extruders (TSEs). The extruder for the second layer was a 27 mm TSE. The first and third extruders were fed a polyethylene terephthalate (PET) of 0.62 inherent viscosity (IV) ("TAIRILIN IN404"), each at 4.5 kg/hr. The second extruder was fed either a glycol-modified polyester resin (PETG) ("EASTAR COPOLYESTER GN071"), PENg30 (a polyethylene naphthalate copolymer formed as the reaction product of 100% dimethyl 2,6-naphthalene dicarboxylate as the diester reactant, and 70 mol % ethylene glycol and 30 mol % cyclohexane dimethanol as the diol reactants), PES:PESg (50:50) (a 50:50 blend of polyethylene sebacate and a glycol-modified polyethylene sebacate copolymer formed as the reaction product of 100% sebacic acid as the diacid reactant, and 13 mol % ethylene glycol and 87 mol % cyclohexane dimethanol as the diol reactants), or a polyester resin (coPET60 ("MOR-ESTER AF-428 P")), at 2.25 kg/hr., depending on the Example number (see Table 1, above). In each Example, the second extruder was also fed with 0.09 wt. % of a photochromic (gray) dye (obtained under the trade designation "REVERSACOL VOLCANIC GRAY" from Vivimed Labs Europe Ltd., Huddersfield West, Yorkshire, England). The first and third extruders fed neck tubes, and gear pumps were employed to feed the extrudates into the first and third layers of a 3-layer feed block. This melt train used a progressive temperature extrusion profile, with peak temperatures of 275° C. The second extruder fed a neck tube, and a gear pump was employed to feed the extrudate into the second layer of the 3-layer feed block. This melt train used a progressive temperature extrusion profile, with peak temperatures of about 240° C. From the feed block, the three-layer extrudate was fed to a film die. The feed block and die were maintained at a target temperature of 275° C. Film from the die was cast on a casting wheel which was maintained at run at 15° C.

Example 16

A film cast web was prepared as in Example 15, except that an ultra violet absorber (UVA) ("TINUVIN 1577") was added at 3 wt. %, well dispersed in the polyester matrix, to the third layer.

Examples 17-20

A film cast web was prepared as follows. A 3-layer film was co-extruded. The extruders for the first and third layers were 18 mm twin screw extruders (TSEs). The extruder for the second layer was a 27 mm TSE. The first extruder was fed a polyethylene terephthalate (PET) of 0.62 inherent viscosity (IV) ("TAIRILIN IN404"), 2.25 kg/hr. The second extruder was fed a polyester resin (coPET60 ("MOR-ESTER AF-428 P")) with 0.22 wt. % of a photochromic (purple) dye ("REVERSACOL PALATINATE PURPLE"), at 2.25 kg/hr. The third extruder was fed a filled polyester made from 80, 90, or 95 wt. % of a polyethylene terephthalate (PET) of 0.62 inherent viscosity (IV) ("TAIRILIN IN404"), and 20, 10, or 5 wt. % of a carbon black (obtained under the trade designation "BLACK PEARLS 1300" from Cabot Corporation, Boston, MA), depending on the Example number (see Table 1, above), at 2.25 kg/hr. For Example 17, an ultra violet absorber (UVA) ("TINUVIN 1577") was added at 3 wt. %, well dispersed in the polyester matrix, to the third layer. The first and third extruders fed neck tubes, and gear pumps were employed to feed the extrudates into the first and third layers of a 3-layer feed block. This melt train used a progressive temperature extrusion profile, with peak temperatures of 275° C. The second extruder fed a neck tube, and a gear pump was employed to feed the extrudate into the second layer of the 3-layer feed block. This melt train used a progressive temperature extrusion profile, with peak temperatures of about 240° C. From the feed block, the three-layer extrudate was fed to a film die. The feed block and die were maintained at a target temperature of 275° C. Film from the die was cast on a casting wheel which was maintained at run at 15° C.

Therefore, in the various Examples, there are six polymeric materials, either homopolymers, copolymers, or polymer blends, that bear a photochromic dye additive. The Glass Transition Temperature ($T_g$) of each of these is given in Table 2, below.

TABLE 2

| Polymeric Material | Tg ° C. |
|---|---|
| PENg30 | 115 |
| PET | 81 |
| PETg | 80 |
| CoPET60:PET (50:50) | 35* |
| CoPET60 | 0 |
| PES:PESg (50:50) | −45 |

*calculated value from the individual polymers using the Fox Equation

Film Stretching

Film cast webs of Examples 1-20 were oriented by stretching and annealed in a two-stage film stretching device (obtained under the trade designation "KARO IV" from Bruckner Group GmbH, Siegsdorf, Germany) using the following procedure: A cast web specimen was conveyed into an oven maintained at 100° C., held for 30 seconds, and then stretched to an overall stretch ratio of 3.5×3.5 (i.e., the relatively uniformly stretched area of the film was 3.5 times longer in each or the two orthogonal stretching directions than the same portion of the initial cast web specimen). This film was then conveyed into an annealing oven maintained at 225° C. where it was held, restrained, for 15 seconds. The film was then removed from the stretching device and evaluated.

Photochromic Transition Testing

Stretched and annealed films of Examples 1-20 were tested for their photochromic transitions. For each test specimen, a tungsten halogen light source (obtained under the trade designation "HL-2000 MIKROPACK" from Ocean Optics, Inc., Dunedin, FL) was used with collimating optics to shine through a 1 mil (25.4 micrometers) polyimide film and the test specimen film, in that order. The polyimide film served to prevent blue wavelengths emitted by the tungsten filament source from causing a photochromic change in the test specimen, by absorbing those wavelengths. After 5 seconds, the films were exposed from the opposite side to light from a 385-nm ultraviolet (UV) Light Emitting Diode (LED) lamp of the type typically used as a curing lamp, driven by a controller power supply (obtained under the trade designation "CF2000 REV 3.0 POWER SUPPLY AND LN72-365-0708147 PARALLEL, 6 SERIES LED" from Clearstone Technologies, Inc., Hopkins, MN), for 20 seconds, and after the 20 seconds, the LED is turned off. Light from the tungsten source that passes through the test specimen is collected with an integrating sphere (obtained under the trade designation "FIOS-1" from Ocean Optics, Inc., Dunedin, FL). The transmitted light is then analyzed using a spectrometer (obtained under the trade designation "USB2000+" from Ocean Optics, Inc., Dunedin, FL). Spectral data was recorded beginning before the 385 nm LED was turned on and continued to be recorded during the 20 seconds of exposure to the LED, and for an additional 85 seconds after the LED was turned off. This setup allowed the absorption spectra to be recorded throughout the photochromic transition. Using spectral data at 610 nm, the Activation Speed, the Fully Activated VLT, and the Fade Speed, were determined. The Activation Speed is presented as the time, in seconds, for the photochromic transition to proceed half-way to its ultimate saturation level after the LED is turned on. Fully Activated VLT is presented as the Visible Light Transmission, at the saturation level for the photochromic transition, as a fraction of the Visible Light Transmission prior to turning on the LED (T/To). The Fade Speed is presented as the time, in seconds, for the photochromic transition to reverse itself half-way to the specimen's original state from the ultimate saturation level after the LED is turned off.

Haze Testing

Haze results were obtained using a haze measurement system (obtained under the trade designation "HAZE-GARD PLUS" from BYK-Gardner GmbH, Geretsried, Germany) in the standard way, according to the manufacturer's instructions.

Photochromic Transition and Haze results for films of Examples 1-20 are shown in Table 3, below.

TABLE 3

| Example | Fully Activated VLT | Activation Speed, seconds | Fade Speed, seconds | Haze |
|---|---|---|---|---|
| 1 | * | ** | ** | 1.70 |
| 1A | * | ** | ** | 2.07 |
| 2 | 0.31 | 6.3 | 6.3 | 0.97 |
| 2A | 0.24 | 6.6 | 6.1 | 1.45 |
| 3 | 0.39 | 5.4 | 5.4 | 1.19 |
| 3A | 0.27 | 5.3 | 6.4 | 1.40 |
| 4 | 0.64 | 4.9 | 4.7 | 1.80 |
| 4A | 0.60 | 4.9 | 4.4 | 2.53 |
| 5 | 0.75 | 5.1 | 5.5 | 2.23 |
| 5A | 0.61 | 4.9 | 5.6 | 3.99 |
| 6 | 0.42 | 6.2 | 5.3 | 2.45 |
| 6A | 0.24 | 6.6 | 7.0 | 1.90 |
| 7 | 0.36 | 5.8 | 4.6 | 2.60 |
| 7A | 0.33 | 5.5 | 4.8 | 3.59 |
| 8 | 0.51 | 5.0 | 2.9 | 2.50 |
| 8A | 0.35 | 4.8 | 3.4 | 4.78 |
| 9 | 0.76 | 17.7 | 60+ | 0.48 |
| 9A | 0.71 | 18.4 | 60+ | 0.32 |
| 10 | * | ** | ** | 3.23 |
| 10A | * | ** | ** | 3.17 |
| 11 | * | ** | ** | 0.38 |
| 11A | * | ** | ** | 0.55 |
| 12 | * | ** | ** | 0.42 |
| 12A | * | ** | ** | 0.60 |
| 13 | * | ** | ** | 61.6 |
| 13A | * | ** | ** | 88.9 |
| 14 | 0.92 | 13.2 | 5.9 | 17.9 |
| 14A | 0.90 | 13.4 | 6.3 | 21.8 |
| 15 | 0.92 | 7.3 | 7.5 | 1.15 |
| 15A | 0.88 | 7.6 | 8.4 | 1.89 |

TABLE 3-continued

| Example | Fully Activated VLT | Activation Speed, seconds | Fade Speed, seconds | Haze |
|---|---|---|---|---|
| 16 | 0.93 | 6.8 | 4.6 | 1.38 |
| 16A | 0.90 | 6.9 | 6.5 | 2.17 |
| 17 | 0.86 | 4.1 | 2.8 | 1.89 |
| 17A | 0.83 | 4.2 | 2.3 | 3.23 |
| 18 | 0.83 | 2.5 | 2.1 | 2.18 |
| 18A | 0.70 | 3.5 | 2.4 | 2.52 |
| 19 | 0.84 | 2.6 | 2.2 | 3.65 |
| 19A | 0.83 | 2.8 | 2.1 | 4.50 |
| 20 | 0.91 | 2.1 | 1.6 | 9.16 |
| 20A | 0.91 | 2.7 | 1.7 | 11.30 |

\* - No transmission difference was observed
\*\* - No Activation Speed or Fade Speed observable Note that Examples I and II exhibit no photochromic transition because they contain no photochromic dye. Examples 10, 12, and 13, which also exhibited no observable photochromic transition, are the Examples in which the polymeric material in the layer bearing the photochromic dye is one of the relatively high $T_g$ materials: PET, PETG, or PENg30.

Examples 21-25

In an effort to determine whether the compositions of Examples 12 and 13 might in fact exhibit a small photochromic effect which is merely difficult to detect by the methods used above, the following tests were performed. For the compositions of Examples 11-15, specimens of the thicker of the two unstretched cast webs were tested for photochromic transition as described above. These specimens, precursors to the 2 mils (50.8 micrometers) stretched films, were approximately 24.5 mils (622 micrometers) thick. The specimen of the composition of Example 11 was used as a control, as it contained no photochromic dye. The specimens of the compositions of Examples 14 and 15 were included for comparison. In addition to the calculation of the Fully Activated VLT, the arithmetic mean VLT (T/To) for the entire data-set from the 20 second exposure was calculated, in order to determine if there might be some small effect masked by "noise" in the data. Finally, for Examples 22-25, the well-known statistical test called the Two-Sample T Test was performed, with respect to Example 21 in each case, in order to determine whether the data sets were statistically significantly different (P-Value=0) at the level of a 95% Confidence Interval (CI). It was determined that for Examples 22 and 23, using cast webs of the compositions of Examples 12A and 13A, very small but nonetheless statistically significant photochromic transitions can be detected. Results are shown in Table 4, below.

TABLE 4

| Example | Cast Web of Ex. No. | Fully Activated VLT | Activation Speed, seconds | Fade Speed, seconds | Mean VLT, T/To | P Value, 95% CI |
|---|---|---|---|---|---|---|
| 21 | 11A | * | ** | ** | 1.002 | * |
| 22 | 12A | * | ** | ** | 0.993 | 0 |
| 23 | 13A | * | ** | ** | 0.997 | 0 |
| 24 | 14A | 0.62 | 3.4 | 6.2 | 0.923 | 0 |
| 25 | 15A | 0.51 | 12.8 | 18.5 | 0.746 | 0 |

\*No transmission difference was observed.
\*\*No Activation Speed or Fade Speed was observed.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A photochromic article having first and second opposed major surfaces comprising:
   a first, transparent layer having first and second opposed major surfaces, the first layer comprising thermoplastic;
   a second, transparent layer having first and second opposed major surfaces, the second layer comprising photochromic dye and amorphous copolyester having a glass transition temperature not greater than 40° C., wherein the first major surface of the second layer is adjacent to the second major surface of the first layer; and
   a third layer having first and second opposed major surfaces, wherein the first major surface of the third layer is adjacent to the second major surface of the second layer.

2. The photochromic article of claim 1, wherein the first major surface of the second layer is in direct contact with the second major surface of the first layer; and wherein the first major surface of the third layer is in direct contact with the second major surface of the second layer.

3. The photochromic article of claim 1, wherein the thermoplastic comprises at least one of polyethylene terephthalate, polyethylene naphthalate, or a copolymer thereof.

4. The photochromic article of claim 1, wherein the thermoplastic comprises at least one of a polycarbonate, a poly(methyl methacrylate), a polystyrene, a cyclic olefin polymer, a cyclic olefin co-polymer, or a poly(butylene terephthalate).

5. The photochromic article of claim 1, wherein the first layer further comprises at least one of a pigment or dye that absorbs at least one wavelength in a range from 280 nm to 2000 nm.

6. The photochromic article of claim 1, wherein the photochromic dye is present in the second layer in an amount of at least 0.01 percent and amorphous copolyester in an amount up to 99.99 percent, based on the total weight of the second layer.

7. The photochromic article of claim 1, wherein the article has a shrinkage at 150° C. of less than 1.5 percent.

8. The photochromic article of claim 1, wherein the photochromic dye is at least one of a spiroxazine or a naphthopyran.

9. The photochromic article of claim 1, wherein the copolyester in the second layer has a glass transition temperature, $T_g$, not greater than 90° C.

10. The photochromic article of claim 1 having in an unactuated state at 610 nanometers a first visible light transmission and in an actuated state at 610 nanometers a second visible light transmission, when the difference between the second visible light transmission and the first transmission is at least 80 percent.

11. The photochromic article of claim 1, wherein the second layer has fade speed of up to 5 seconds.

12. The photochromic article of claim 1, wherein the second layer has an activation speed of up to 5 seconds.

13. The photochromic article of claim 1, wherein the third layer comprises a semi-crystalline polyester, and further wherein the semi-crystalline polyester of the third layer comprises at least one of polyethylene terephthalate, polyethylene naphthalate, or a copolymer thereof.

14. The photochromic article of claim 1 having an average thickness of at least 15 micrometers.

15. The photochromic article of claim 1 having an optical haze up to 3 percent.

16. The photochromic article of claim 1, wherein the amorphous copolyester comprises at least one of glycol-modified polyethylene terephthalate, polyethylene terephthalate/sebacate, or polyethylene terephthalate/adipate.

* * * * *